US012660058B2

(12) United States Patent
Bradford

(10) Patent No.: US 12,660,058 B2
(45) Date of Patent: Jun. 16, 2026

(54) FREQUENCY-CONTROLLED LIGHT-EMITTING DIODE DEVICES AND RELATED METHODS

(71) Applicant: CreeLED, Inc., Durham, NC (US)

(72) Inventor: Everett Bradford, Apex, NC (US)

(73) Assignee: CreeLED, Inc., Durham, NC (US)

( * ) Notice: Subject to any disclaimer, the term of this patent is extended or adjusted under 35 U.S.C. 154(b) by 95 days.

(21) Appl. No.: 18/414,999

(22) Filed: Jan. 17, 2024

(65) Prior Publication Data

US 2025/0234437 A1 Jul. 17, 2025

(51) Int. Cl.

*H05B 45/305* (2020.01)
*H05B 45/325* (2020.01)
*H05B 47/155* (2020.01)
*H05B 47/16* (2020.01)

(52) U.S. Cl.

CPC ......... *H05B 45/305* (2020.01); *H05B 45/325* (2020.01); *H05B 47/155* (2020.01); *H05B 47/16* (2020.01)

(58) Field of Classification Search

CPC .. H05B 45/305; H05B 45/325; H05B 47/155; H05B 47/16

See application file for complete search history.

(56) References Cited

U.S. PATENT DOCUMENTS

| | | | | |
|---|---|---|---|---|
| 8,937,557 | B2 * | 1/2015 | Loveland | H05B 47/165 340/815.45 |
| 9,705,594 | B2 * | 7/2017 | Bradford | H05B 45/54 |
| 2006/0038803 | A1 * | 2/2006 | Miller | H05B 45/48 345/204 |
| 2012/0306370 | A1 * | 12/2012 | Van De Ven | H05B 45/28 315/192 |
| 2013/0106305 | A1 * | 5/2013 | Whitaker | H05B 47/10 315/210 |
| 2015/0115816 | A1 * | 4/2015 | Bradford | H05B 45/46 315/192 |
| 2021/0120643 | A1 * | 4/2021 | Ye | H05B 45/46 |
| 2024/0147588 | A1 * | 5/2024 | Wray | H05B 45/46 |

* cited by examiner

*Primary Examiner* — Patrick C Chen
(74) *Attorney, Agent, or Firm* — Withrow & Terranova, P.L.L.C.

(57) ABSTRACT

Light-emitting diode (LED) devices and, more particularly, frequency-controlled LED devices and related methods are disclosed. LED devices include frequency-controlled circuitry that controls changes to electrical activation of one or more LED chips based on changes to input signal frequencies. Input signals are provided in a pulsed manner and the frequency-controlled circuitry controls how long one or more LED chips are electrically activated during each pulse. In certain aspects, the frequency-controlled circuitry delays current flow through one or more LED chips according to a time delay. By adjusting the frequency of the input signal, the amount of time the one or more LED chips are electrically activated during each pulse is adjustable. Corresponding LED packages include LED chips and integrated frequency-controlled circuitry so that separate control for LED chips is provided without requiring separate input signals.

21 Claims, 9 Drawing Sheets

FREQUENCY-CONTROLLED LIGHT-EMITTING DIODE DEVICES AND RELATED METHODS

FIELD OF THE DISCLOSURE

The present disclosure relates to light-emitting diode (LED) devices and, more particularly, to frequency-controlled LED devices and related methods.

BACKGROUND

Light-emitting diodes (LEDs) are solid-state devices that convert electrical energy to light and generally include one or more active layers of semiconductor material (or an active region) arranged between oppositely doped n-type and p-type layers. When a bias is applied across the doped layers, holes and electrons are injected into the one or more active layers where they recombine to generate emissions such as visible light or ultraviolet emissions.

LEDs have been widely adopted in various illumination contexts, for backlighting of liquid crystal display (LCD) systems (e.g., as a substitute for cold cathode fluorescent lamps) and for direct-view LED displays. Applications utilizing LED arrays include vehicular headlamps, roadway illumination, light fixtures, and various indoor, outdoor, and specialty contexts. Desirable characteristics of LED devices include high luminous efficacy and long lifetime.

LED packages have been developed that can provide mechanical support, electrical connections, and encapsulation for LED emitters. Lumiphoric materials, such as phosphors, may also be arranged in close proximity to LED emitters to convert portions of light emissions to different wavelengths. Multiple chip LED packages, such as LED packages with different colored LED chips, are commonly used in LED display applications. As LED technology continues to be developed for ever-evolving modern applications, challenges exist in keeping up with operating demands for LED packages and related elements of LED packages.

The art continues to seek improved LED array devices with small pixel pitches while overcoming limitations associated with conventional devices and production methods.

SUMMARY

The present disclosure relates to light-emitting diode (LED) devices and, more particularly, to frequency-controlled LED devices and related methods. LED devices include frequency-controlled circuitry that controls changes to electrical activation of one or more LED chips based on changes to input signal frequencies. Input signals are provided in a pulsed manner, such as by pulse-width modulation (PWM), and the frequency-controlled circuitry controls how long one or more LED chips are electrically activated during each pulse of the input signal. In certain aspects, the frequency-controlled circuitry delays current flow through one or more LED chips according to a time delay. By adjusting the frequency of the input signal, the amount of time the one or more LED chips are electrically activated during each pulse is adjustable. Corresponding LED packages may include LED chips and integrated frequency-controlled circuitry so that separate control for LED chips is provided without requiring separate input signals.

In one aspect, an LED device comprises: a first LED chip and a second LED chip; an anode terminal and a cathode terminal that are both electrically coupled to the first LED chip and the second LED chip; and frequency-controlled circuitry electrically coupled with the anode terminal and the cathode terminal, the frequency-controlled circuitry configured to control electrical activation of the first LED chip differently from the second LED chip based on a frequency of a pulse width modulation (PWM) signal received at the anode terminal and cathode terminal. In certain embodiments, the frequency-controlled circuitry comprises: a first transistor, wherein a drain of the first transistor is electrically coupled to the first LED chip, and a source of the first transistor is electrically coupled to the cathode terminal; and a first resistor and a capacitor that form a resistor-capacitor filter electrically coupled between the anode terminal and the cathode terminal, the resistor-capacitor filter providing a first gate voltage to a gate of the first transistor. The LED device may further comprise a second resistor electrically coupled between the gate of the first transistor and the cathode terminal. The LED device may further comprise a third resistor electrically coupled between the second LED chip and the cathode terminal. The LED device may further comprise a second transistor, wherein a drain of the second transistor is electrically coupled to the second LED chip, a source of the second transistor is electrically coupled to the cathode terminal, and a gate of the second transistor is electrically coupled between the first LED chip and the first transistor. The LED device may further comprise a third resistor electrically coupled between the anode terminal and the gate of the second transistor. The LED device may further comprise: a digital circuit; a first transistor, wherein a drain of the first transistor is electrically coupled to the first LED chip, a source of the first transistor is electrically coupled to the cathode terminal, and a gate of the first transistor is electrically coupled to the digital circuit; and a second transistor, wherein a drain of the second transistor is electrically coupled to the first LED chip, a source of the second transistor is electrically coupled to the cathode terminal, and a gate of the second transistor is electrically coupled to the digital circuit. The LED device may further comprise a first diode and a first capacitor electrically coupled between the anode terminal and the cathode terminal, wherein a power input to the digital circuit is electrically coupled between the first diode and the first capacitor. In certain embodiments, a signal input is provided between the anode terminal and the digital circuit, and the digital circuit is configured to interpret a frequency of an input signal received at the anode terminal to provide controls to the gates of the first transistor and the second transistor separately from one another. The LED device may further comprise: a third LED chip electrically coupled between the anode terminal and the cathode terminal; and a third transistor, wherein a drain of the third transistor is electrically coupled to the third LED chip, a source of the third transistor is electrically coupled to the cathode terminal, and a gate of the third transistor is electrically coupled to the digital circuit. The LED device may further comprise a support structure on which the first LED chip, the second LED chip, and the frequency-controlled circuitry reside to form an LED package, wherein the anode terminal forms an anode contact of the LED package and the cathode terminal forms a cathode contact of the LED package. The LED device may further comprise an encapsulant that encapsulates the first LED chip, the second LED chip, and the frequency-controlled circuitry. In certain embodiments, the support structure comprises a submount. In certain embodiments, the support structure comprises a lead frame.

In another aspect, a method of light output control for an LED device comprises: receiving a pulse width modulation (PWM) input signal at frequency-controlled circuitry from an anode terminal and a cathode terminal that are common to a first LED chip and a second LED chip; and controlling electrical activation of the first LED chip differently from the second LED chip based on a frequency of the PWM input signal. In certain embodiments: electrical activation of the first LED chip is controlled based on a time delay provided by the frequency-controlled circuitry; and electrical activation of the second LED chip follows the PWM input signal. In certain embodiments: electrical activation of the first LED chip is controlled based on a time delay provided by the frequency-controlled circuitry; and electrical activation of the second LED chip is provided at a rising edge of each pulse of the PWM input signal, and the second LED chip is electrically deactivated when the first LED chip is electrically activated. In certain embodiments, the frequency-controlled circuitry comprises a digital circuit that adjusts electrical activation of the first LED chip differently from the second LED chip based on the frequency of the PWM input signal. In certain embodiments, the first LED chip, the second LED chip, and the frequency-controlled circuitry are arranged on a support structure within an LED package. In certain embodiments, the anode terminal forms an anode contact of the LED package, and the cathode terminal forms a cathode contact of the LED package. In certain embodiments, the LED package comprises an encapsulant that encapsulates the first LED chip, the second LED chip, and the frequency-controlled circuitry.

In another aspect, any of the foregoing aspects individually or together, and/or various separate aspects and features as described herein, may be combined for additional advantage. Any of the various features and elements as disclosed herein may be combined with one or more other disclosed features and elements unless indicated to the contrary herein.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1B:
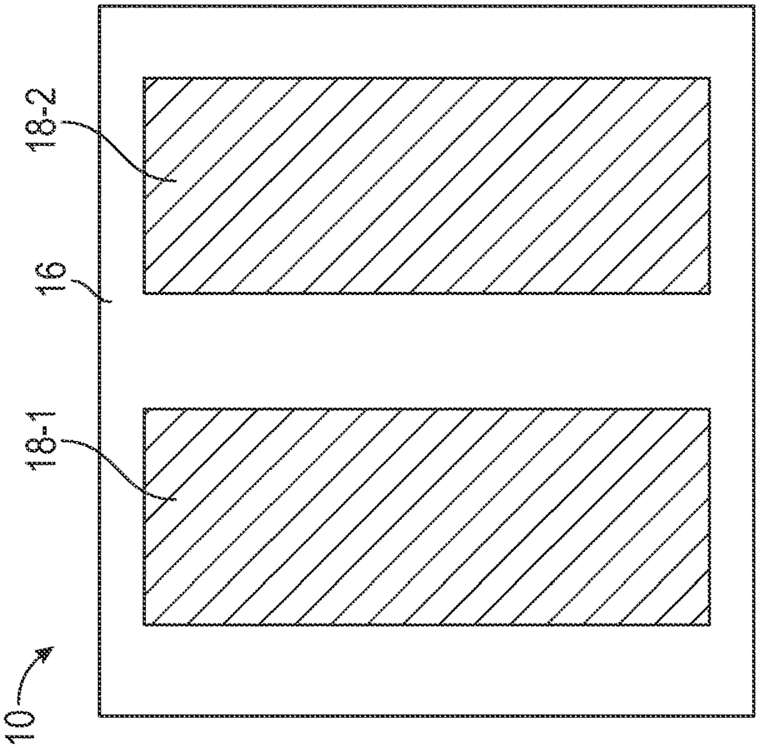
FIG. 1B is a bottom view of the LED package of FIG. 1A.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures.

It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments are described herein with reference to schematic illustrations of embodiments of the disclosure. As such, the actual dimensions of the layers and elements can be different, and variations from the shapes of the illustrations as a result, for example, of manufacturing techniques and/or tolerances, are expected. For example, a region illustrated or described as square or rectangular can have rounded or curved features, and regions shown as straight lines may have some irregularity. Thus, the regions illustrated in the figures are schematic and their shapes are not intended to illustrate the precise shape of a region of a device and are not intended to limit the scope of the disclosure. Additionally, sizes of structures or regions may be exaggerated relative to other structures or regions for illustrative purposes and, thus, are provided to illustrate the general structures of the present subject matter and may or may not be drawn to scale. Common elements between figures may be shown herein with common element numbers and may not be subsequently re-described.

The present disclosure relates to light-emitting diode (LED) devices and, more particularly, to frequency-controlled LED devices and related methods. LED devices include frequency-controlled circuitry that controls changes to electrical activation of one or more LED chips based on changes to input signal frequencies. Input signals are provided in a pulsed manner, such as by pulse-width modulation (PWM), and the frequency-controlled circuitry controls how long one or more LED chips are electrically activated during each pulse of the input signal. In certain aspects, the frequency-controlled circuitry delays current flow through one or more LED chips according to a time delay. By adjusting the frequency of the input signal, the amount of time the one or more LED chips are electrically activated during each pulse is adjustable. Corresponding LED packages may include LED chips and integrated frequency-controlled circuitry so that separate control for LED chips is provided without requiring separate input signals.

Before delving into specific details of various aspects of the present disclosure, an overview of various elements that may be included in exemplary LED packages of the present disclosure is provided for context. An LED chip typically comprises an active LED structure or region that can have many different semiconductor layers arranged in different ways. The fabrication and operation of LEDs and their active structures are generally known in the art and are only briefly discussed herein. The layers of the active LED structure can be fabricated using known processes with a suitable process being fabrication using metal organic chemical vapor deposition. The layers of the active LED structure can comprise many different layers and generally comprise an active layer sandwiched between n-type and p-type oppositely doped epitaxial layers, all of which are formed successively on a growth substrate. It is understood that additional layers and elements can also be included in the active LED structure, including, but not limited to, buffer layers, nucleation layers, super lattice structures, undoped layers, cladding layers, contact layers, and current-spreading layers and light extraction layers and elements. The active layer can comprise a single quantum well, a multiple quantum well, a double heterostructure, or super lattice structures.

Active LED structures of LED chips may be configured to emit various wavelengths of light depending on the composition of the active layer. In certain embodiments, the active LED structure emits blue light with a peak wavelength range of approximately 430 nanometers (nm) to 480 nm. In other embodiments, the active LED structure emits green light with a peak wavelength range of 500 nm to 570 nm. In other embodiments, the active LED structure emits red light with a peak wavelength range of 600 nm to 700 nm. In certain embodiments, the active LED structure may be configured to emit light that is outside the visible spectrum, including one or more portions of the ultraviolet (UV) spectrum in a range from 100 nm to 400 nm, or one or more portions of the near infrared spectrum, and/or the infrared spectrum (e.g., 700 nm to 1000 nm).

An LED chip can also be covered with one or more lumiphoric materials (also referred to herein as lumiphors), such as phosphors, such that at least some of the light from the LED chip is absorbed by the one or more lumiphors and is converted to one or more different wavelength spectra according to the characteristic emission from the one or more lumiphors. In this regard, at least one lumiphor receiving at least a portion of the light generated by the LED source may re-emit light having different peak wavelength than the LED source. An LED source and one or more lumiphoric materials may be selected such that their combined output results in light with one or more desired characteristics such as color, color point, intensity, etc. In certain embodiments, aggregate emissions of LED chips, optionally in combination with one or more lumiphoric materials, may be arranged to provide cool white, neutral white, or warm white light, such as within a color temperature range of 2500 Kelvin (K) to 10,000 K. In certain embodiments, lumiphoric materials having cyan, green, amber, yellow, orange, and/or red peak emission wavelengths may be used. In some embodiments, the combination of the LED chip and the one or more lumiphors (e.g., phosphors) emits a generally white combination of light. The one or more phosphors may include yellow (e.g., YAG:Ce), green (e.g., LuAg:Ce), and red (e.g., $Ca_{i-x-y}Sr_x Eu_y AlSiN_3$) emitting phosphors, and combinations thereof.

Lumiphoric materials as described herein may be or include one or more of a phosphor, a scintillator, a lumiphoric ink, a quantum dot material, a day glow tape, and the like. Lumiphoric materials may be provided by any suitable means, for example, direct coating on one or more surfaces of an LED, dispersal in an encapsulant material configured to cover one or more LEDs, and/or coating on one or more optical or support elements (e.g., by powder coating, inkjet printing, or the like). In certain embodiments, lumiphoric materials may be downconverting or upconverting, and combinations of both downconverting and upconverting materials may be provided. In certain embodiments, multiple different (e.g., compositionally different) lumiphoric materials arranged to produce different peak wavelengths may be arranged to receive emissions from one or more LED chips. One or more lumiphoric materials may be provided on one or more portions of an LED chip in various configurations. In certain embodiments, lumiphoric materials may be provided over one or more surfaces of LED chips, while other surfaces of such LED chips may be devoid of lumiphoric material.

According to aspects of the present disclosure, LED packages may include one or more elements, such as lumiphoric materials, encapsulants, light-altering materials, lenses, and electrical contacts, among others that are provided with one or more LED chips. Light-altering materials may be arranged within LED packages to reflect or otherwise redirect light from the one or more LED chips in a desired emission direction or pattern. In certain aspects, an LED package may include a support member, such as a submount or a lead frame. Suitable materials for submounts include, but are not limited to, ceramic materials such as aluminum oxide or alumina, AlN, or organic insulators like polyimide (PI) and polyphthalamide (PPA). Submounts may also comprise a printed circuit board (PCB), sapphire, Si or any other suitable material. For PCB embodiments, different PCB types can be used such as standard FR-4 PCB, metal core PCB, or any other type of PCB. In still further embodiments, the support structure may embody a lead frame structure with a lead frame and a corresponding housing positioned about portions of the lead frame. Light-altering materials may be arranged within LED packages to reflect or otherwise redirect light from the one or more LED chips in a desired emission direction or pattern. An encapsulant material, such as silicone or epoxy, may fill the recess to encapsulate the one or more LED chips.

As used herein, light-altering materials may include many different materials including light-reflective materials that reflect or redirect light, light-absorbing materials that absorb light, and materials that act as a thixotropic agent. As used herein, the term “light-reflective” refers to materials or particles that reflect, refract, or otherwise redirect light. For light-reflective materials, the light-altering material may include at least one of fused silica, fumed silica, titanium dioxide ($TiO_2$), or metal particles suspended in a binder, such as silicone or epoxy. For light-absorbing materials, the light-altering material may include at least one of carbon, silicon, or metal particles suspended in a binder, such as silicone or epoxy. The light-reflective materials and the light-absorbing materials may comprise nanoparticles. In certain embodiments, the light-altering material may comprise a generally white color to reflect and redirect light. In other embodiments, the light-altering material may comprise a generally opaque or black color for absorbing light and increasing contrast.

Multiple chip LED packages typically include two or more LED chips housed and electrically connected within a common package. Exemplary multiple chip packages include those with red, blue, and green emitting LED chips. Additional exemplary packages may further include a white LED chip that is a blue or green LED chip with a corresponding lumiphoric material, such as phosphor. Other exemplary packages may include multiple white LED chips that provide different emission colors, such as warm white and cool white. In still further applications, the principles disclosed are equally applicable to multiple LED chips of a same emission color within a common package.

In certain applications, it is desirable to separately control LED chips within a multiple chip LED package. For example, separately controlling LED chips with different emission color points provides the ability to adjust an overall color of aggregate emissions from the LED package. In certain applications, multiple chip LED packages may be tunable to vary a correlated color temperatures (CCT) between individual color points of LED chips, such as along a black body locus of a chromaticity diagram. Additionally, multiple chip LED packages may be tunable changes to a hue or between different saturated colors. Conventional multiple chip LED packages with color adjustability typically have additional electrical connections, communication lines, and/or specialized controllers to provide individual addressability for multiple LED chips. According to aspects of the present disclosure, electrical activation of different LED chips within the same LED package is accomplished by way of frequency-controlled circuitry within the LED package. The frequency-controlled circuitry may operate multiple LED chips differently with only two electrical connections, positive and negative, for the package, thereby reducing complexity as compared with conventional techniques.

As disclosed herein, frequency-controlled circuitry may be configured to receive a single pulse width modulation (PWM) signal and adjust electrical activation of one or more the LED chips differently from other LED chips in response to changes in frequency of the PWM signal. In certain embodiments, the frequency-controlled circuitry may include a resistor-capacitor (RC) filter that creates a time delay for a gate of a transistor that controls operation of a first LED chip. The time delay may cause a delayed turn-on for the first LED chip at a rising edge of a received PWM signal as compared with a second LED chip in the package. In this manner, changes to the frequency of the PWM signal may alter a ratio of light between the first and second LED chips in overall emissions of the LED package. For example, adjusting to a lower frequency may provide wider pulse edges so that a threshold for the delayed turn-on is reached and the first LED chip is electrically activated for a longer duration of the PWM pulse. Alternatively, adjusting to a higher frequency may provide shorter pulse edges so that the threshold for the delayed turn-on is reached and the first LED chip is electrically activated for a shorter duration of the PWM pulse, or the pulse edge may be so short that the first LED chip is not electrically activated for any portion of the PWM pulse. Additional embodiments are disclosed where the frequency-controlled circuitry includes additional circuitry to provide further control of ratios of light between multiple LED chips. According to aspects of the present disclosure, frequency-controlled circuitry may provide color adjustability in existing PWM-controlled LED devices and systems with possible firmware adjustments while avoiding hardware and/or circuit board design changes. Notably, the PWM signal may continue to be used to control brightness of LED chips while frequency adjustments may provide adjustments to color ratios of light between individual LED chips.

Figure 1A:
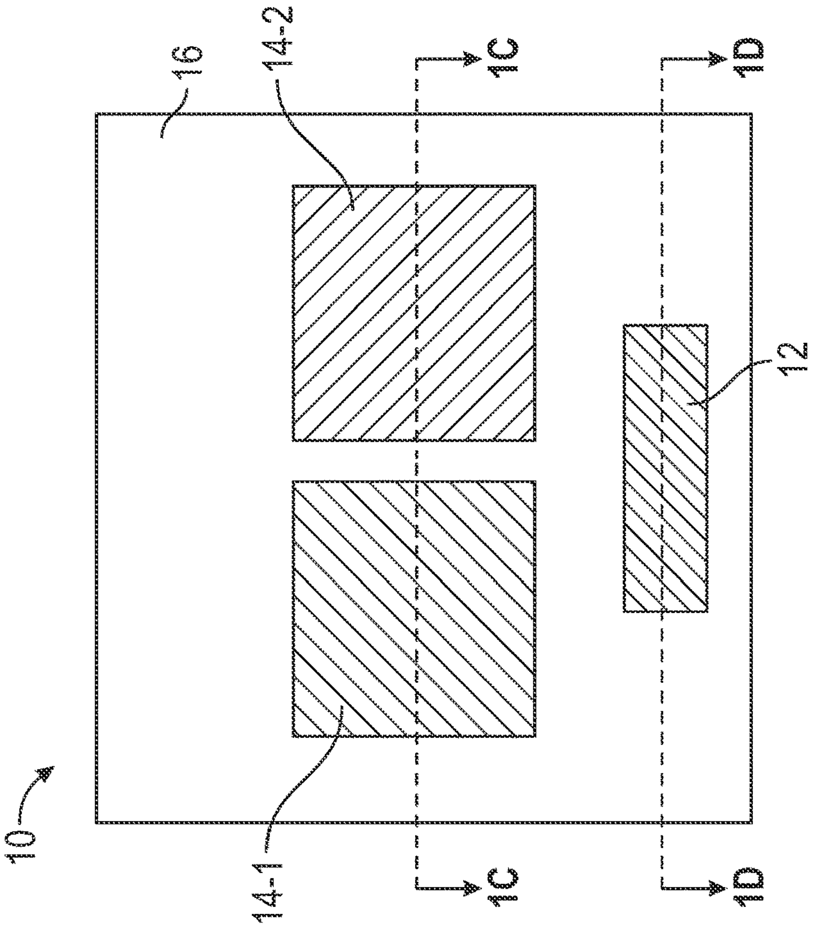
FIG. 1A is a top view of a light-emitting diode (LED) package with frequency-controlled circuitry according to embodiments of the present disclosure.

FIGS. 1A to 1D provide various views of an LED package 10 with frequency-controlled circuitry 12 according to embodiments of the present disclosure. FIG. 1A is a top view of the LED package 10 and illustrates a first LED chip 14-1 and a second LED chip 14-2 arranged on a support structure 16. As described above, the support structure 16 may embody a submount with electrical traces thereon or a lead frame structure. In certain embodiments, the frequency-controlled circuitry 12 is provided on a same surface as the LED chips 14-1, 14-2, such as a top surface of the support structure 16. FIG. 1B is a bottom view of the LED package 10 of FIG. 1A. As illustrated, the LED package includes package contacts 18-1, 18-2 on the bottom surface of the support structure 16. The package contacts 18-1, 18-2 form positive and negative electrical connections for both the LED chips 14-1, 14-2 on the top surface of the support structure 16 of FIG. 1A. As will be described later in greater detail, the frequency-controlled circuitry 12 provides the ability to control electrical activation of the LED chips 14-1, 14-2 differently from one another while only needing two package contacts (i.e., anode contact and cathode contact).

Figure 1D:
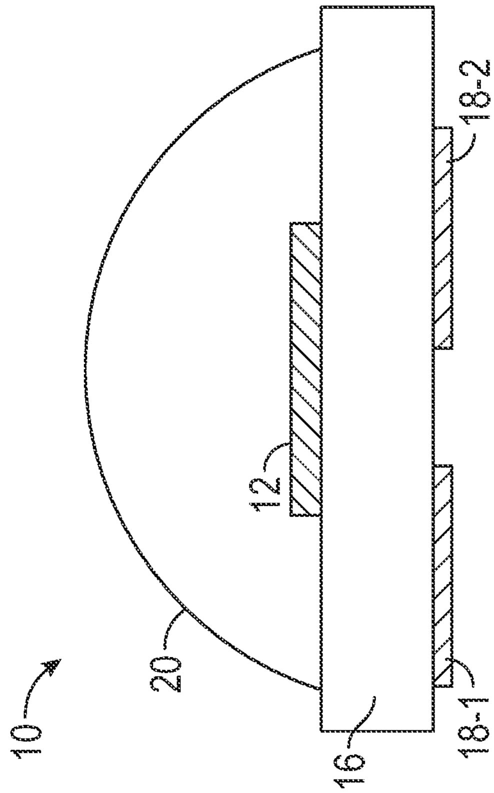
FIG. 1D is a cross-section of the LED package of FIG. 1A taken along the sectional line 1D-1D of FIG. 1A.
Figure 1C:
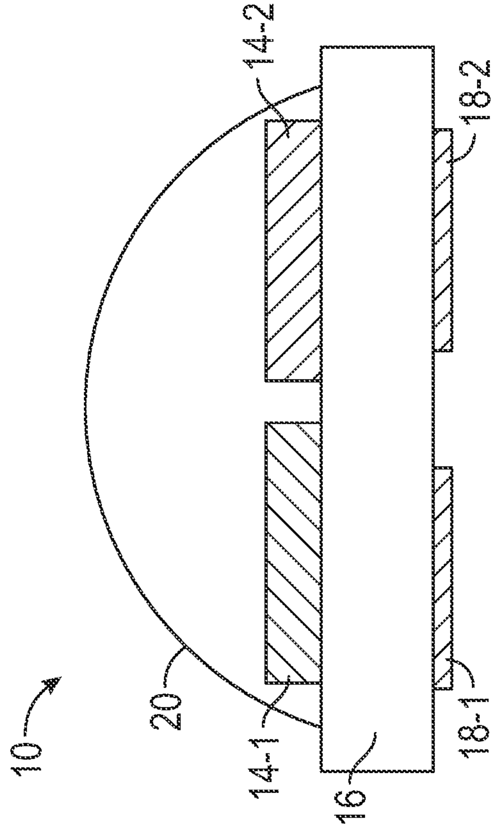
FIG. 1C is a cross-section of the LED package of FIG. 1A taken along the sectional line 1C-1C of FIG. 1A.

FIG. 1C is a cross-section of the LED package 10 of FIG. 1A taken along the sectional line 1C-1C, and FIG. 1D is a cross-section of the LED package 10 of FIG. 1A taken along the sectional line 1D-1D. In FIGS. 1C and 1D, an encapsulant 20 is provided that covers and otherwise encapsulates both the LED chips 14-1, 14-2 and the frequency-controlled circuitry 12 on the support structure 16. The encapsulant 20 may comprise silicone, glass, or the like and, in certain embodiments, may form the shape of a lens, such as the dome-shaped structure. Other suitable lens shapes include hemispheric, ellipsoid, ellipsoid bullet, cubic, flat, hex-shaped, and square. In certain embodiments, a suitable shape includes both curved and planar surfaces, such as a hemispheric or curved top portion with planar side surfaces. By incorporating the frequency-controlled circuitry 12 within the LED package 10, the LED package 10 may easily be incorporated within PWM-controlled LED applications. This provides the ability to control LED chips within the same package differently without added complexity from having separate PWM signals for each individual LED chip. In this manner, the LED package 10 may replace a conventional LED package in a PWM system and with some possible firmware adjustments, color adjustability may be accomplished without the need for changing hardware or circuit board designs.

Figure 2:
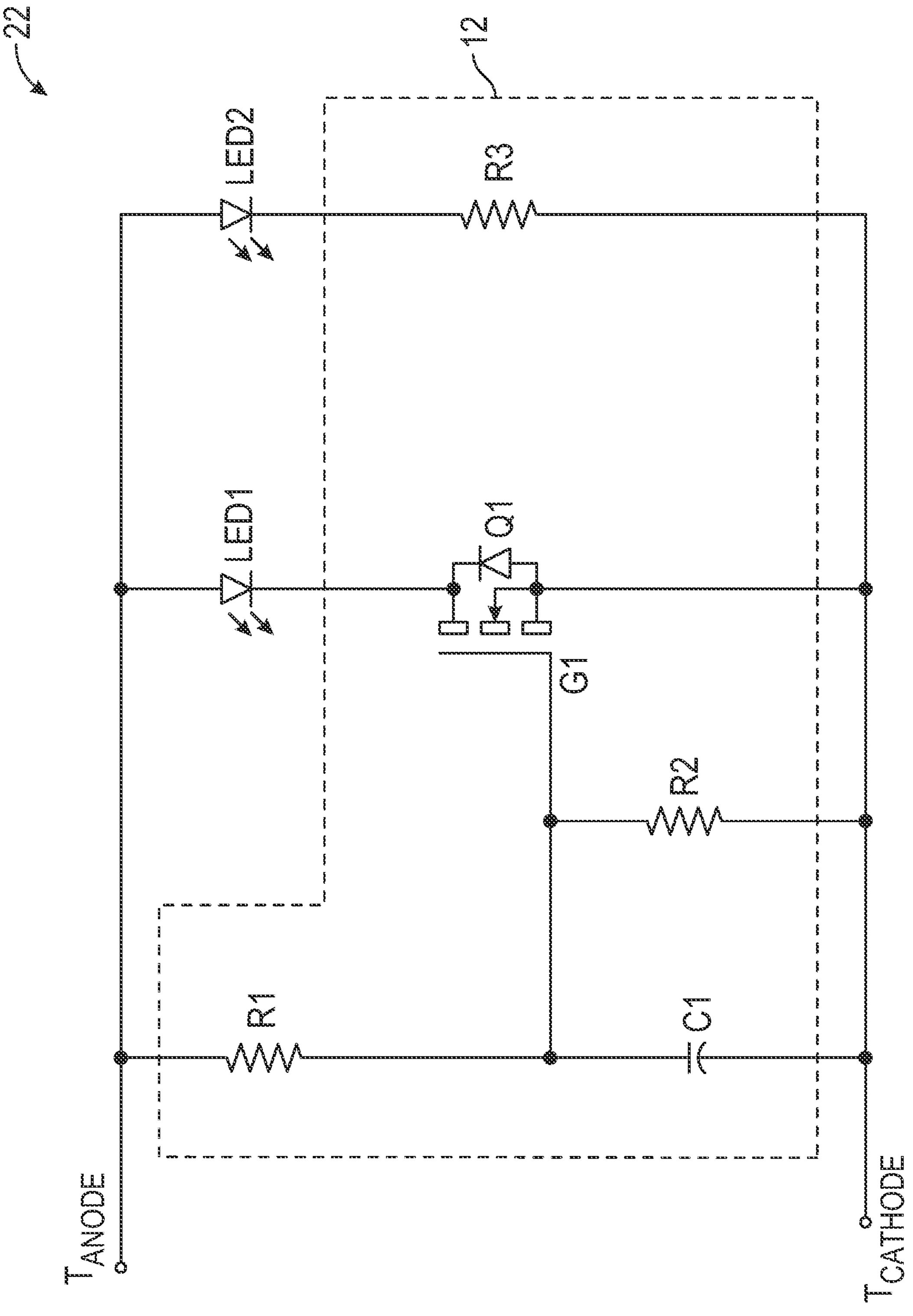
FIG. 2 is a schematic diagram of an LED device with frequency-controlled circuitry according to aspects of the present disclosure.

FIG. 2 is a schematic diagram of an LED device 22 with frequency-controlled circuitry 12 according to aspects of the present disclosure. The LED device 22 may embody the LED package 10 of FIGS. 1A to 1D. In other embodiments, the LED device 22 may embody system level architecture. As illustrated, the LED device 22 includes LED1 and LED2 that are both electrically coupled with the same anode terminal $T_{ANODE}$ and cathode terminal $T_{CATHODE}$. The frequency-controlled circuitry 12 is electrically coupled between the terminals $T_{ANODE}$ and $T_{CATHODE}$ and to the LED1 and LED2. For embodiments where the LED device 22 is the LED package 10 of FIGS. 1A to 1D, the LED1 and LED2 are the LED chips 14-1, 14-2, and the terminals $T_{ANODE}$ and $T_{CATHODE}$ are the package contacts 18-1, 18-2. In such embodiments, one or more electrical control lines as depicted in FIG. 2 may embody electrical traces of a submount or leads of a lead frame structure. As described in greater detail below, the frequency-controlled circuitry 12 of FIG. 2 is provided to adjust the on-time of LED1 while the on-time of LED2 generally follows the input signal.

In certain embodiments, the frequency-controlled circuitry 12 includes an arrangement of resistors R1 to R3, a capacitor C1, and a transistor Q1, such as a metal-oxide-semiconductor field-effect transistor (MOSFET). The resistor R1 and the capacitor C1 form a resistor-capacitor filter electrically coupled between the terminals $T_{ANODE}$ and $T_{CATHODE}$. A drain of Q1 is coupled to LED1 while a source of Q1 is coupled to the terminal $T_{CATHODE}$. A gate G1 of Q1 is coupled between R1 and C1 of the resistor-capacitor filter. During operation, power is supplied to the LED device 22 on the terminals $T_{ANODE}$ and $T_{CATHODE}$ as a pulsed direct-current input signal, such as a PWM signal, with varying on and off times. The filter formed by R1 and C1 creates a time delay from the rising edge of the input signal to the gate G1 of Q1. After the time delay, the gate voltage for Q1 will reach its threshold and Q1 will begin to conduct, turning on or electrically activating LED1. Without a similar resistor-capacitor filter and transistor configuration, LED2 may always be on during the on-time of the input signal. In this manner, adjustments to the frequency of the input signal may change the duration of electrical activation of LED1 relative to LED2. R3 is positioned between LED2 and $T_{CATHODE}$. In certain embodiments, a current of LED2 may be matched to LED1 by adjusting R3 to match the on-state resistance of Q1. R3 may also be adjusted higher to fine-tune the range of electrical activation ratios of LED1 to LED2. R2 may be positioned between the input to the gate G1 of Q1 from the filter formed by R1 and C1 and to the $T_{CATHODE}$ to drain a gate voltage of Q1 during the off time of the input signal so that the cycle can repeat.

Figure 3A:
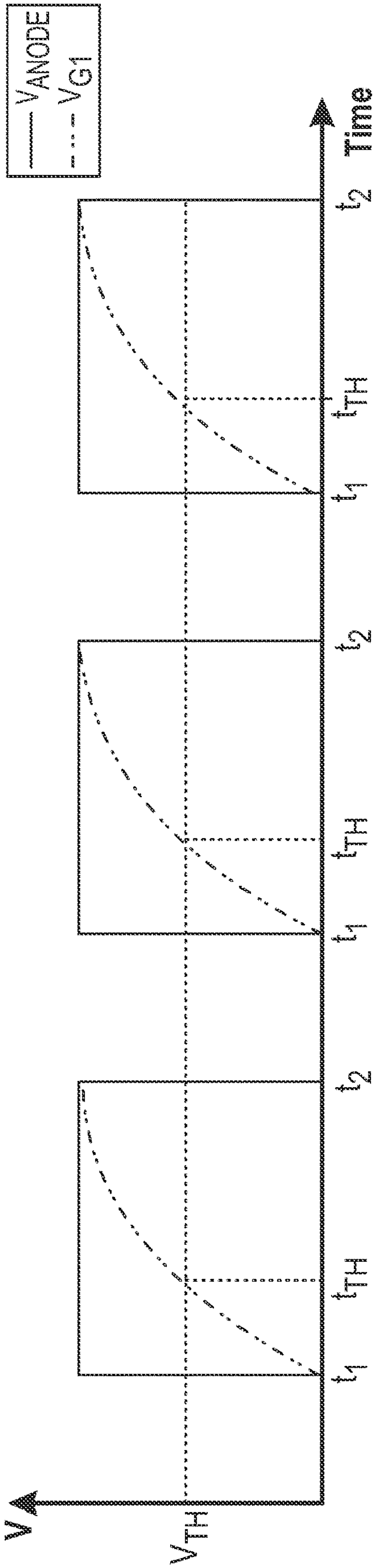
FIG. 3A is a timing diagram illustrating a comparison of a voltage of an input signal of FIG. 2 to a gate voltage of FIG. 2.
Figure 3B:
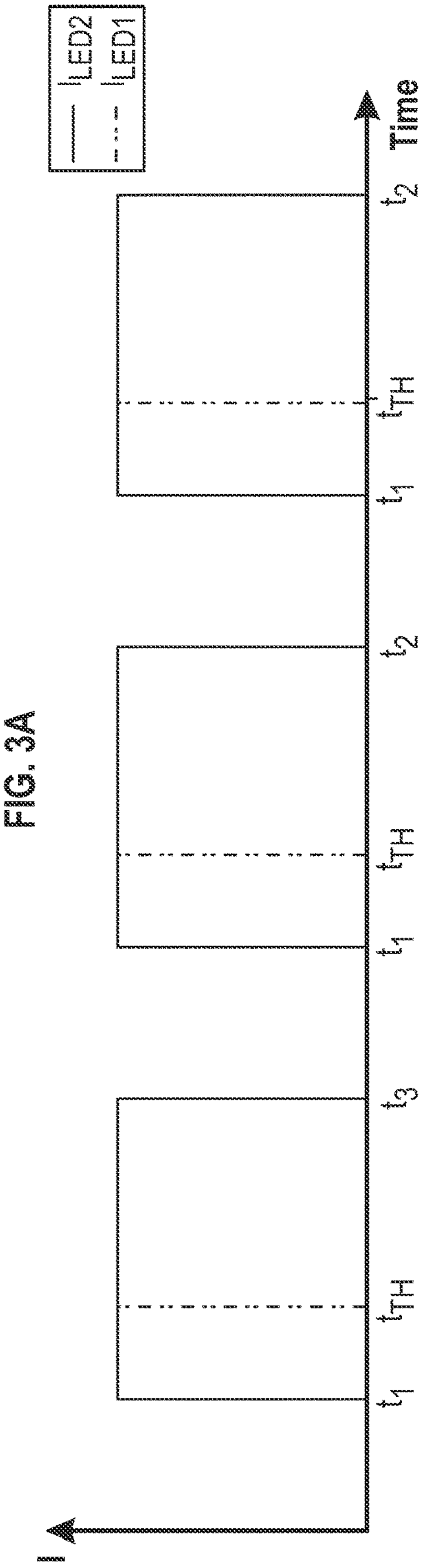
FIG. 3B is a corresponding timing diagram illustrating the current to each of the LEDs during the timing diagram of FIG. 3A.

FIGS. 3A and 3B illustrate exemplary timing diagrams for the LED device 22 of FIG. 2. FIG. 3A is a timing diagram illustrating a comparison of a voltage $V_{ANODE}$ of the input signal of FIG. 2 to a gate voltage $V_{G1}$ of FIG. 2. FIG. 3B is a corresponding timing diagram illustrating the current $I_{LED1}$ and $I_{LED2}$ to each of the LEDs (LED1 and LED2) during the timing diagram of FIG. 3A. As illustrated in FIG. 3A, the voltage of the input signal $V_{ANODE}$ is a square wave signal, such as a PWM signal, where time $t_1$ corresponds with a rising edge and time $t_2$ corresponds with falling edge of the input signal. The time delay provided by the resistor-capacitor filter of FIG. 2 provides a more gradual rise for the gate voltage $V_{G1}$. Once the gate voltage $V_{G1}$ crosses a threshold voltage VTH at a time $t_{TH}$, the transistor Q1 of FIG. 2 will begin to conduct, thereby electrically activating LED1. This is further illustrated by the profiles of the currents $I_{LED1}$ and $I_{LED2}$ in FIG. 3B. As illustrated, the current $I_{LED2}$ may generally follow the voltage of the input signal $V_{ANODE}$ for LED2 while the current $I_{LED1}$ for the LED1 does not turn on until the threshold voltage VTH is reached at time $t_{TH}$. Both currents $I_{LED1}$ and $I_{LED2}$ turn off at the falling edge at time $t_2$. In this regard, changing a frequency of the input signal will change the pulse duration between the rising edge (i.e., $t_1$) and the falling edge (i.e., $t_2$) and therefore alter how long LED1 is electrically activated during each pulse. Accordingly, a ratio of light between LED1 and LED2 in aggregate emissions may be adjusted, even continuously, by changing the frequency of the input signal.

Figure 4:
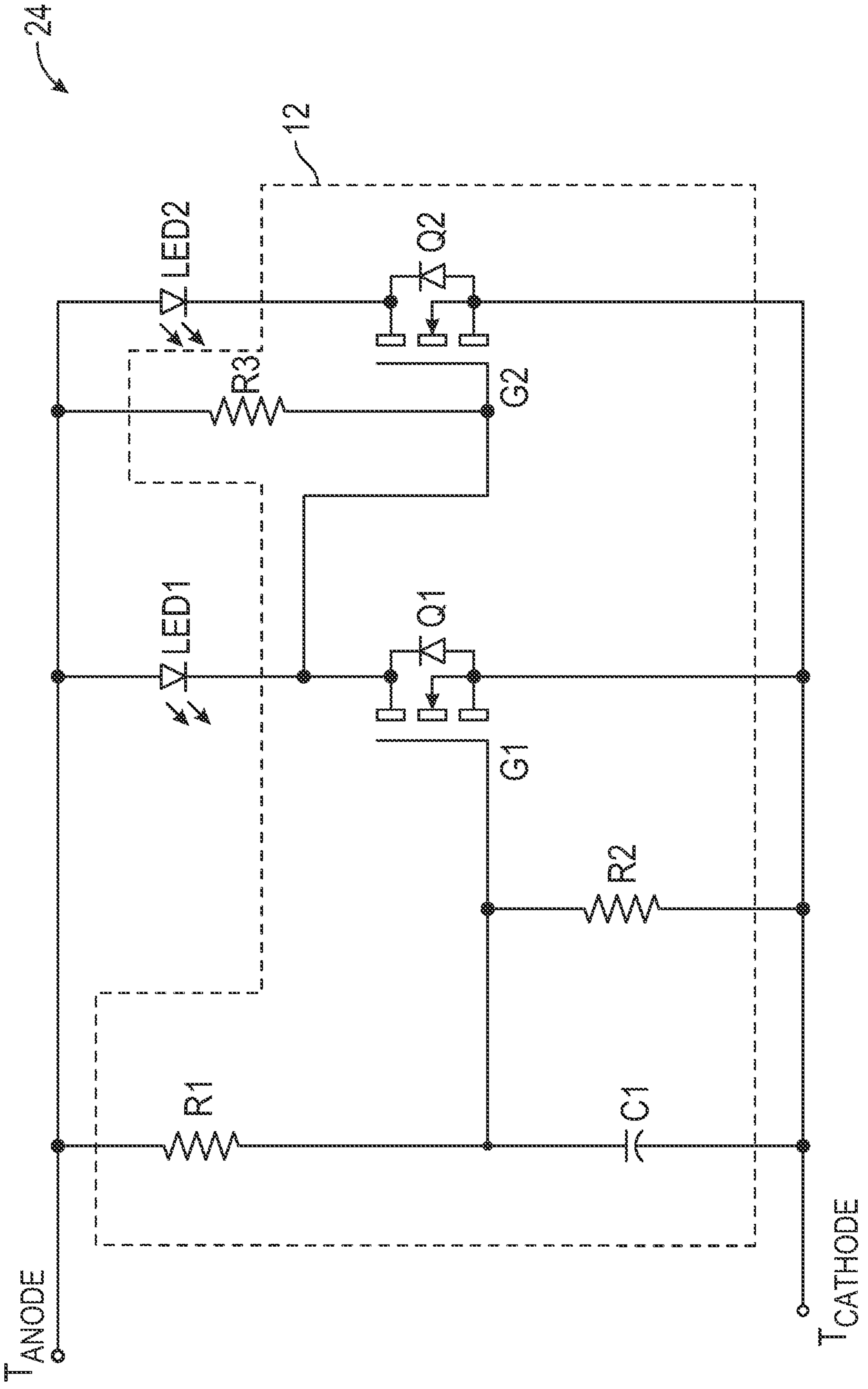
FIG. 4 is a schematic diagram of an LED device that is similar to the LED device of FIG. 2 except the frequency-controlled circuitry is configured to adjust the on-time of both LEDs according to aspects of the present disclosure.

FIG. 4 is a schematic diagram of an LED device 24 that is similar to the LED device 22 of FIG. 2 except the frequency-controlled circuitry 12 is configured to adjust the on-time of both LED1 and LED2 according to aspects of the present disclosure. The LED device 24 may embody the LED package 10 of FIGS. 1A to 1D. In other embodiments, the LED device 24 may embody system level architecture. The frequency-controlled circuitry 12 of FIG. 4 includes an arrangement of resistors R1 to R3, the capacitor C1, and the transistor Q1, such as a MOSFET. In FIG. 4, R1 and C1 form a resistor-capacitor filter that provides a gate voltage to the gate G1 of Q1 in a similar manner as described above for FIG. 2. In this regard, when the gate voltage for Q1 reaches its threshold, Q1 will begin to conduct, thereby turning on or electrically activating LED1. R2 may be positioned between Q1 and the filter formed by R1 and C1 to drain a gate voltage of Q1 during the off time of the input signal so that the cycle can repeat.

As further illustrated in FIG. 4, the frequency-controlled circuitry 12 also includes another transistor Q2, such as a MOSFET, where a drain of Q2 is coupled to LED2 and a source of Q2 is coupled to the terminal $T_{CATHODE}$. Additionally, R3 is coupled between the terminal $T_{ANODE}$ and the gate G2 of Q2. In this manner, at a rising edge of the input signal, R3 will bring the gate G2 of Q2 high, thereby turning on or electrically activating LED2. The gate G2 of Q2 is also coupled between LED1 and Q1. Accordingly, when Q1 reaches its threshold and LED1 is electrically activated, the gate G2 of Q2 is pulled low and LED2 turns on. In this arrangement, LED1 and LED2 will be turned on for opposite portions of each pulse of the input signal. Varying the frequency of the input signal adjusts how long LED1 is electrically activated, which in turn adjusts how long LED2 is electrically activated. In this manner, the frequency-controlled circuitry 12 of FIG. 4 provides more control over the ratio of light in aggregate emissions between LED1 and LED2.

Figure 5A:
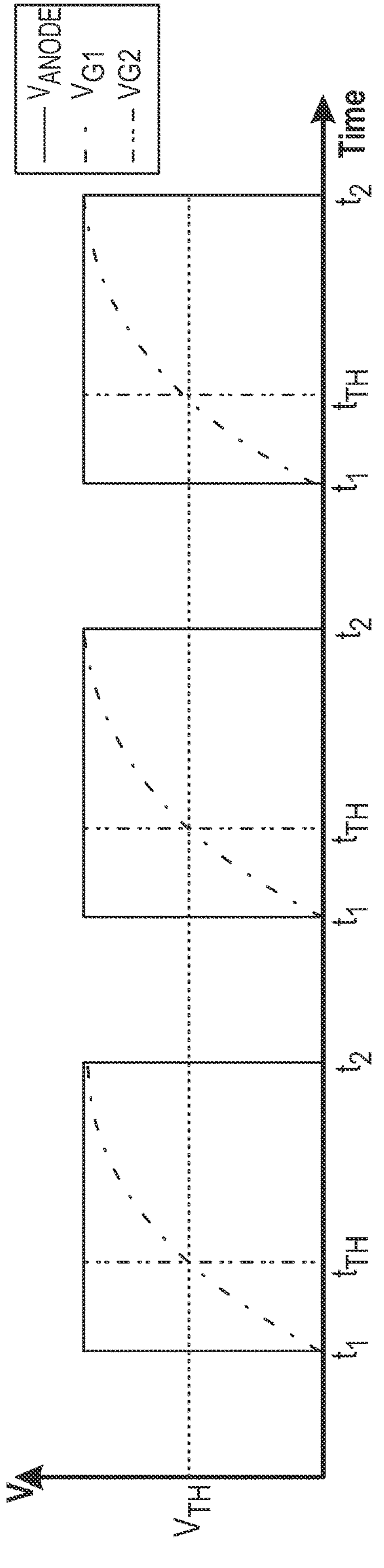
FIG. 5A is a timing diagram illustrating a comparison of a voltage of the input signal of FIG. 4 to gate voltages of FIG. 4.
Figure 5B:
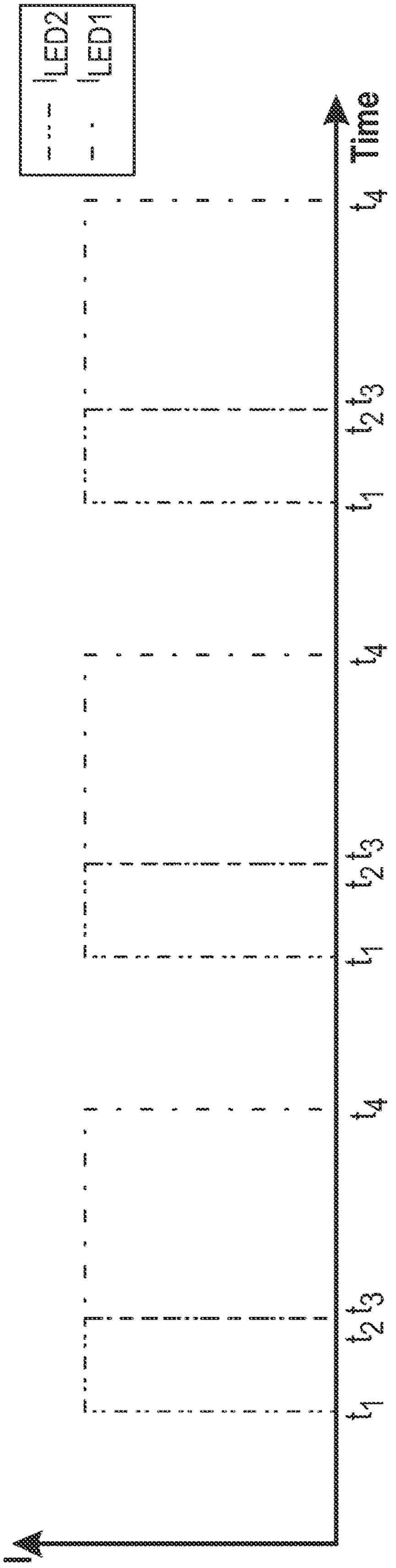
FIG. 5B is a corresponding timing diagram illustrating the current to each of the LEDs during the timing diagram of FIG. 5A.

FIGS. 5A and 5B illustrate exemplary timing diagrams for the LED device 24 of FIG. 4. FIG. 5A is a timing diagram illustrating a comparison of a voltage $V_{ANODE}$ of the input signal of FIG. 4 to gate voltages $V_{G1}$ and $V_{G2}$ of FIG. 4. FIG. 5B is a corresponding timing diagram illustrating the current $I_{LED1}$ and $I_{LED2}$ to each of the LEDs (LED1 and LED2) during the timing diagram of FIG. 5A. As illustrated in FIG. 5A, the gate voltage $V_{G1}$ follows a similar curve as described above for FIG. 3A. As described above for FIG. 4, LED2 no longer directly follows the voltage $V_{ANODE}$ of the input signal. Instead, LED2 is electrically activated at time $t_1$ corresponding with the rising edge of $V_{ANODE}$ and LED2 is electrically deactivated when the gate voltage $V_{G1}$ crosses the threshold voltage VTH at time $t_{TH}$. As illustrated in FIG. 5B, the resulting current flow provides $I_{LED2}$ high from $t_1$ to $t_{TH}$ and low from $t_{TH}$ to $t_2$ and the inverse for $I_{LED1}$. Since the time position of $t_{TH}$ between $t_1$ and $t_2$ is adjustable according to the frequency of the input signal, turn-on durations within each pulse for both LED1 and LED2 are therefore adjustable with frequency changes.

Figure 6A:
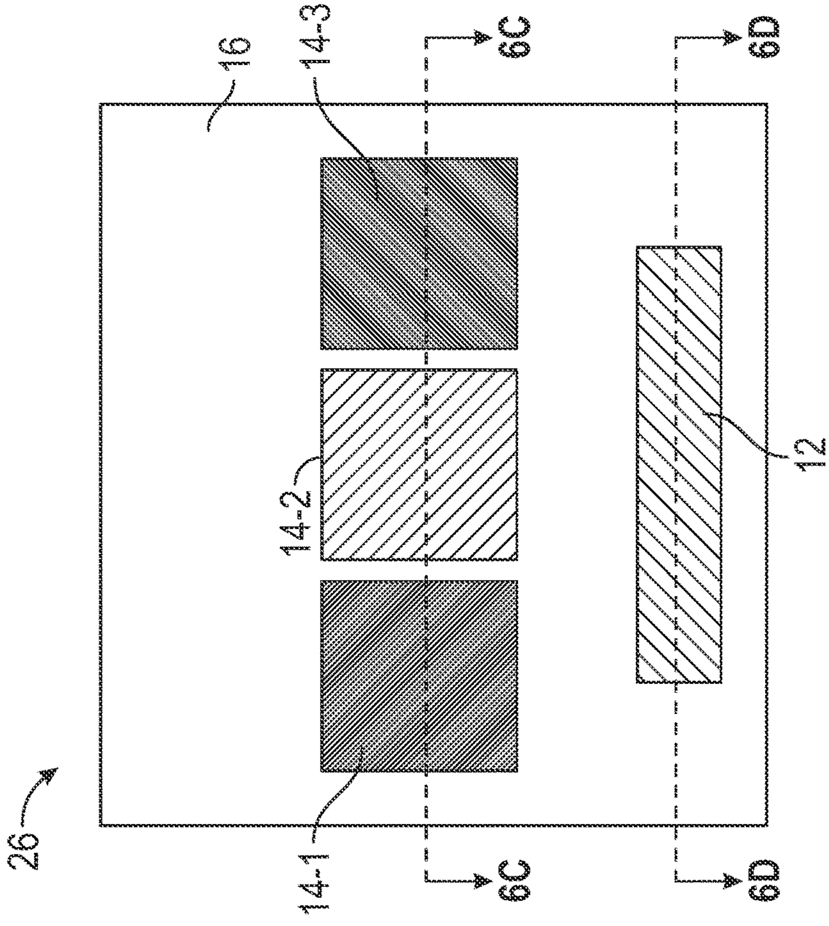
FIG. 6A is a top view of an LED package with frequency-controlled circuitry that adjusts multiple LED chips according to embodiments of the present disclosure.
Figure 6B:
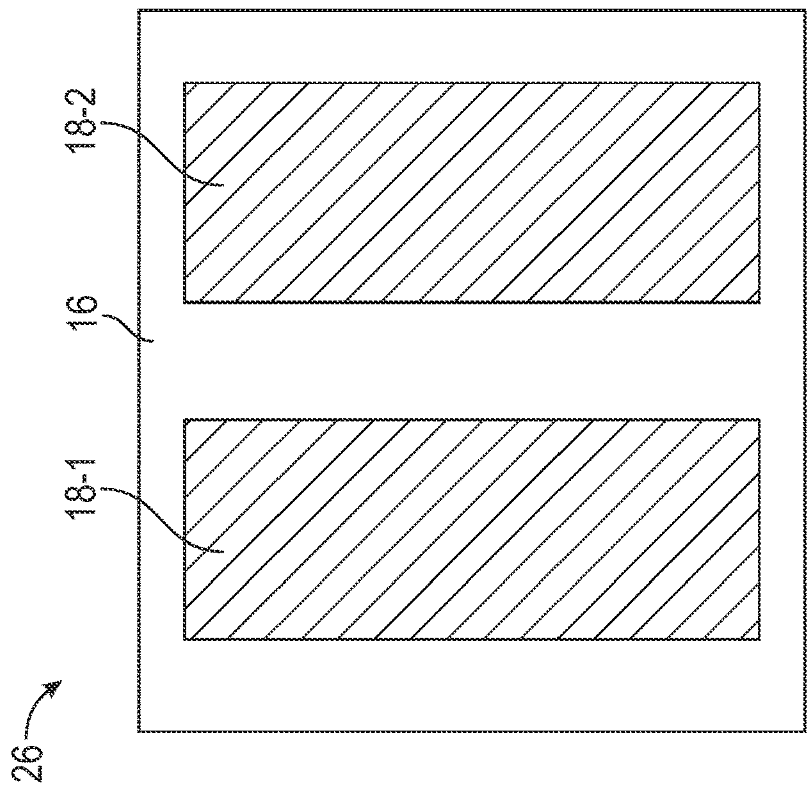
FIG. 6B is a bottom view of the LED package of FIG. 6A.
Figure 6D:
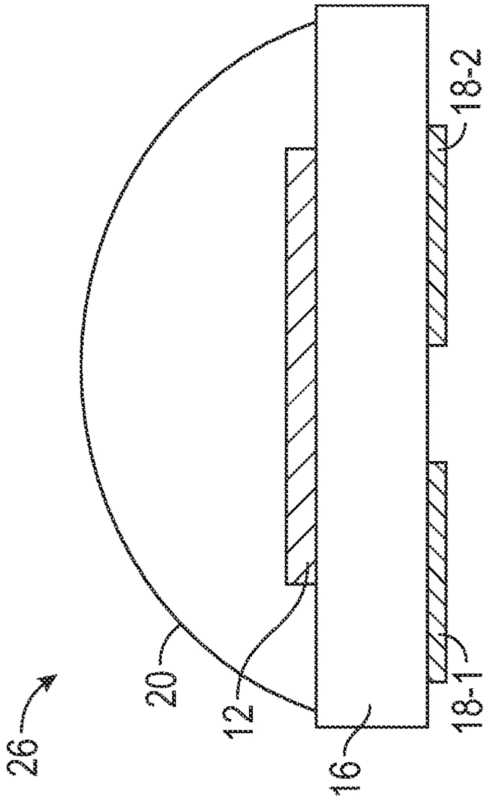
FIG. 6D is a cross-section of the LED package of FIG. 6A taken along the sectional line 6D-6D of FIG. 6A.
Figure 6C:
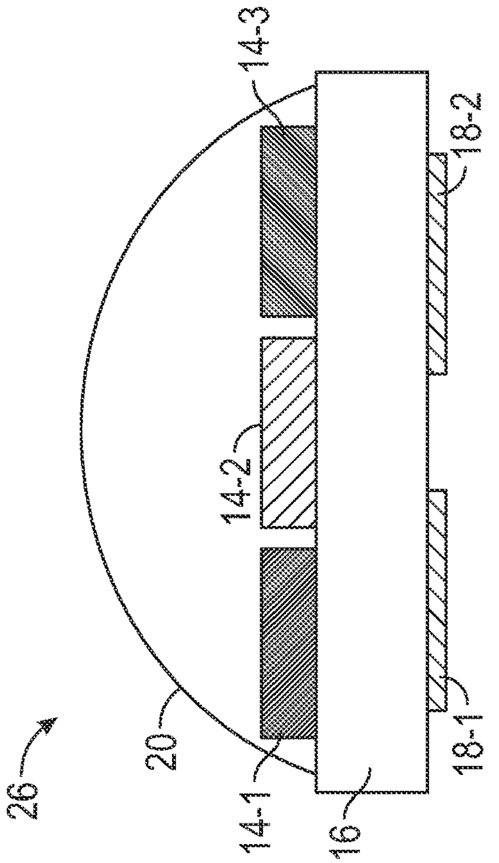
FIG. 6C is a cross-section of the LED package of FIG. 6A taken along the sectional line 6C-6C of FIG. 6A.

FIGS. 6A to 6D provide various views of an LED package 26 that is similar to the LED package 10 of FIGS. 1A to 1D where the frequency-controlled circuitry 12 is configured to adjust light to multiple LED chips 14-1 to 14-3 according to embodiments of the present disclosure. FIG. 6A is a top view of the LED package 26 and illustrates three LED chips 14-1 to 14-3 arranged on the support structure 16. Three LED chips 14-1 to 14-3 are illustrated for exemplary purposes and the principles described are scalable for any number of LED chips, including two or more. FIG. 6B is a bottom view of the LED package 26 of FIG. 6A. As illustrated, the LED package 26 only requires two package contacts 18-1, 18-2 on the bottom surface of the support structure 16, regardless of how many LED chips 14-1 to 14-3 are included. FIG. 6C is a cross-section of the LED package 26 of FIG. 6A taken along the sectional line 6C-6C, and FIG. 6D is a cross-section of the LED package 26 of FIG. 6A taken along the sectional line 6D-6D. In FIGS. 6C and 6D, the encapsulant 20 is provided to cover and otherwise encapsulate both the LED chips 14-1 to 14-3 and the frequency-controlled circuitry 12 on the support structure 16.

Figure 7:
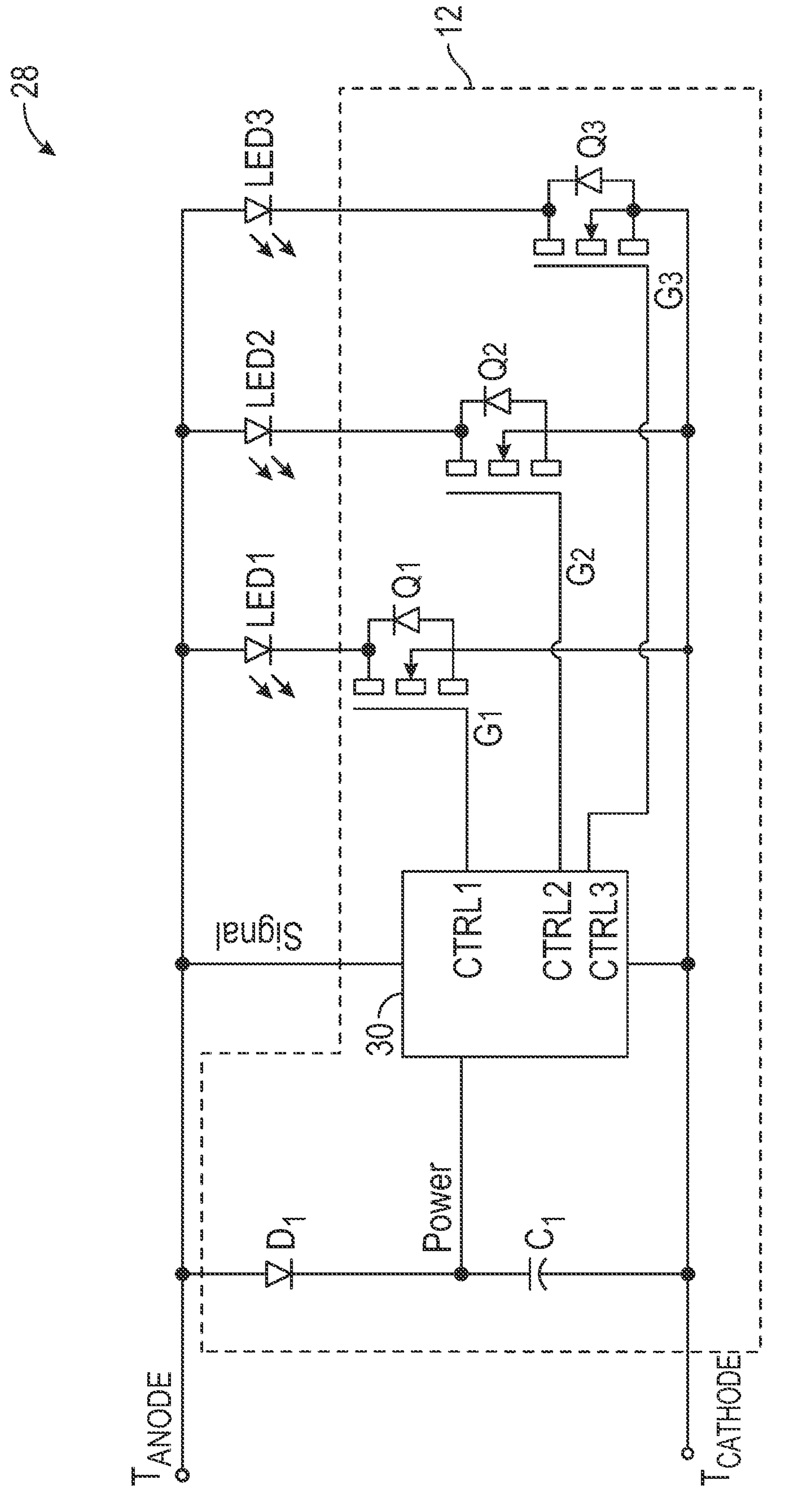
FIG. 7 is a schematic diagram of an LED device with frequency-controlled circuitry for multiple LEDs according to aspects of the present disclosure.

FIG. 7 is a schematic diagram of an LED device 28 with frequency-controlled circuitry 12 for multiple LEDs according to aspects of the present disclosure. The LED device 28 may embody the LED package 26 of FIGS. 6A to 6D. In other embodiments, the LED device 28 may embody system level architecture. As illustrated, the LED device 28 includes LED1 to LED 3 that are all electrically coupled with the same anode and cathode terminals $T_{ANODE}$ and $T_{CATHODE}$. The frequency-controlled circuitry 12 is electrically coupled between the terminals $T_{ANODE}$ and $T_{CATHODE}$ and to the LED1 to LED3. For embodiments where the LED device 28 is the LED package 26 of FIGS. 6A to 6D, the LED1 to LED3 are the LED chips 14-1 to 14-3, and the terminals $T_{ANODE}$ and $T_{CATHODE}$ are the package contacts 18-1, 18-2. As described in greater detail below, the frequency-controlled circuitry 12 of FIG. 7 is provided to separately adjust the on-time of each LED1 to LED 3 based on a frequency of the input signal.

The frequency-controlled circuitry 12 in FIG. 7 includes an arrangement of a capacitor C1, a diode D1, a transistor for each LED1 to LED3, such as MOSFETs Q1 to Q3, and a digital circuit 30 configured to control the gates G1 to G3 of the MOSFETS Q1 to Q3. The drain of each Q1 to Q3 is respectively coupled with a corresponding one of the LED1 to LED3 while the source of each Q1 to Q3 is coupled to the terminal $T_{CATHODE}$. The digital circuit 30 may embody a microcontroller, or an application-specific integrated circuit (ASIC), or similar. The diode D1 and the capacitor C1 are coupled between the terminals $T_{ANODE}$ and $T_{CATHODE}$, and a power input for the digital circuit 30 is coupled between the diode D1 and the capacitor C1. In operation, power is supplied to the LED device 28 on the terminals $T_{ANODE}$ and $T_{CATHODE}$ as a pulsed direct-current input signal, such as a PWM signal, with varying on and off times. The diode D1 and capacitor C1 provide a steady power supply for the digital circuit 30 despite the input signal being provided in a pulsed manner. A signal line to the digital circuit 30 is coupled directly to the $T_{ANODE}$ to monitor the input signal and measure its timing or frequency. The digital circuit 30 is configured to interpret the frequency as a control command and adjust relative levels of the LED1 to LED3 accordingly. In certain embodiments, the digital circuit 30 outputs control voltages CTRL1 to CTRL 3 respectively to the gates G1 to G3 of the MOSFETS Q1 to Q3. In such a configuration, the digital circuit 30 may interpret frequency changes of the input signal and adjust ratios of turn-on times to each LED1 to LED3.

As described above, aspects of the present disclosure relate to frequency-controlled LED devices and related methods where changes to input signal frequencies provide changes to electrical activation of one or more LED chips. Frequency-controlled circuitry as described above controls how long one or more LED chips are electrically activated during each pulse of an input PWM signal based on the particular frequency of the PWM signal. In certain embodiments, when the frequency is changed, the amount of time an LED chip is electrically activated relative to one or more other LED chips is adjusted. In this regard, the duty cycle of the PWM signal may be used to control brightness of LED chips while frequency adjustments may provide relative adjustments to color ratios of light between individual LED chips. In this manner, aspects of the present disclosure advantageously allow adjustments of CCT for general light applications and/or color mixing, such as ratios of light in red-green-blue embodiments, for architectural and/or entertainment applications.

It is contemplated that any of the foregoing aspects, and/or various separate aspects and features as described herein, may be combined for additional advantage. Any of the various embodiments as disclosed herein may be combined with one or more other disclosed embodiments unless indicated to the contrary herein.

Those skilled in the art will recognize improvements and modifications to the preferred embodiments of the present disclosure. All such improvements and modifications are considered within the scope of the concepts disclosed herein and the claims that follow.

What is claimed is:

1. A light-emitting diode (LED) device comprising:
a first LED chip and a second LED chip;
an anode terminal and a cathode terminal that are both electrically coupled to the first LED chip and the second LED chip; and
frequency-controlled circuitry electrically coupled with the anode terminal and the cathode terminal, the frequency-controlled circuitry configured to control electrical activation of the first LED chip differently from the second LED chip based on a frequency of a pulse width modulation (PWM) signal received by the first LED chip and the second LED chip such that a ratio of light output of the first LED chip relative to the second LED chip is adjusted by only changing the frequency of the PWM signal.

2. The LED device of claim 1, wherein the frequency-controlled circuitry comprises:
a first transistor, wherein a drain of the first transistor is electrically coupled to the first LED chip, and a source of the first transistor is electrically coupled to the cathode terminal; and
a first resistor and a capacitor that form a resistor-capacitor filter electrically coupled between the anode terminal and the cathode terminal, the resistor-capacitor filter providing a first gate voltage to a gate of the first transistor.

3. The LED device of claim 2, further comprising a second resistor electrically coupled between the gate of the first transistor and the cathode terminal.

4. The LED device of claim 3, further comprising a third resistor electrically coupled between the second LED chip and the cathode terminal.

5. The LED device of claim 3, further comprising a second transistor, wherein a drain of the second transistor is electrically coupled to the second LED chip, a source of the second transistor is electrically coupled to the cathode terminal, and a gate of the second transistor is electrically coupled between the first LED chip and the first transistor.

6. The LED device of claim 5, further comprising a third resistor electrically coupled between the anode terminal and the gate of the second transistor.

7. The LED device of claim 1, further comprising:
a digital circuit;
a first transistor, wherein a drain of the first transistor is electrically coupled to the first LED chip, a source of the first transistor is electrically coupled to the cathode terminal, and a gate of the first transistor is electrically coupled to the digital circuit; and
a second transistor, wherein a drain of the second transistor is electrically coupled to the first LED chip, a source of the second transistor is electrically coupled to the cathode terminal, and a gate of the second transistor is electrically coupled to the digital circuit.

8. The LED device of claim 7, further comprising a first diode and a first capacitor electrically coupled between the anode terminal and the cathode terminal, wherein a power input to the digital circuit is electrically coupled between the first diode and the first capacitor.

9. The LED device of claim 8, wherein a signal input is provided between the anode terminal and the digital circuit, and the digital circuit is configured to interpret a frequency of an input signal received at the anode terminal to provide controls to the gates of the first transistor and the second transistor separately from one another.

10. The LED device of claim 9, further comprising:
a third LED chip electrically coupled between the anode terminal and the cathode terminal; and
a third transistor, wherein a drain of the third transistor is electrically coupled to the third LED chip, a source of the third transistor is electrically coupled to the cathode terminal, and a gate of the third transistor is electrically coupled to the digital circuit.

11. The LED device of claim 1, further comprising a support structure on which the first LED chip, the second LED chip, and the frequency-controlled circuitry reside to form an LED package, wherein the anode terminal forms an anode contact of the LED package and the cathode terminal forms a cathode contact of the LED package.

12. The LED device of claim 11, further comprising an encapsulant that encapsulates the first LED chip, the second LED chip, and the frequency-controlled circuitry.

13. The LED device of claim 11, wherein the support structure comprises a submount.

14. The LED device of claim 11, wherein the support structure comprises a lead frame.

15. A method of light output control for a light-emitting diode (LED) device, the method comprising:
receiving a pulse width modulation (PWM) input signal at frequency-controlled circuitry, the frequency-controlled circuitry comprising an anode terminal and a cathode terminal that are common to a first LED chip and a second LED chip; and
controlling electrical activation of the first LED chip differently from the second LED chip based on a frequency of the PWM input signal received by the first LED chip and the second LED chip such that a ratio of light output of the first LED chip relative to the second LED chip is adjusted by only changing the frequency of the PWM input signal.

16. The method of claim 15, wherein:
electrical activation of the first LED chip is controlled based on a time delay provided by the frequency-controlled circuitry; and
electrical activation of the second LED chip follows the PWM input signal.

17. The method of claim 15, wherein:
electrical activation of the first LED chip is controlled based on a time delay provided by the frequency-controlled circuitry; and
electrical activation of the second LED chip is provided at a rising edge of each pulse of the PWM input signal, and the second LED chip is electrically deactivated when the first LED chip is electrically activated.

18. The method of claim 15, wherein the frequency-controlled circuitry comprises a digital circuit that adjusts electrical activation of the first LED chip differently from the second LED chip based on the frequency of the PWM input signal.

19. The method of claim 15, wherein the first LED chip, the second LED chip, and the frequency-controlled circuitry are arranged on a support structure within an LED package.

20. The method of claim 19, wherein the anode terminal forms an anode contact of the LED package, and the cathode terminal forms a cathode contact of the LED package.

21. The method of claim 19, wherein the LED package comprises an encapsulant that encapsulates the first LED chip, the second LED chip, and the frequency-controlled circuitry.

* * * * *